United States Patent [19]

Höhner et al.

[11] Patent Number: 5,281,478
[45] Date of Patent: Jan. 25, 1994

[54] METHOD FOR MODIFYING THE SURFACE OF FINELY DIVIDED PARTICLES BY THE APPLICATION OF ORGANOFUNCTIONAL POLYSILOXANES

[75] Inventors: Werner Höhner, Velbert; Dietmar Schaefer, Hattingen, both of Fed. Rep. of Germany

[73] Assignee: Th. Goldschmidt AG, Essen, Fed. Rep. of Germany

[21] Appl. No.: 984,747

[22] Filed: Dec. 3, 1992

[30] Foreign Application Priority Data

Dec. 11, 1991 [DE] Fed. Rep. of Germany ....... 4140793

[51] Int. Cl.$^5$ ............................................... B32B 5/16
[52] U.S. Cl. ................................. 428/404; 427/221; 428/405; 428/407
[58] Field of Search ................ 427/221; 428/404, 405, 428/407

[56] References Cited

U.S. PATENT DOCUMENTS 4,902,570  2/1990  Heinemann et al. ........... 427/221 X
5,182,173  1/1993  Swei .............................. 428/405 X

FOREIGN PATENT DOCUMENTS 0373426  6/1990  European Pat. Off. .
2244489 12/1991 United Kingdom .

OTHER PUBLICATIONS

"Farbmittel" by Dr. W. Damm et al., pp. 734–736, no date.
"Fullstoffe und Verstarkungsmittel" by Dr. H. P. Schlumpf, pp. 613–617, no date.

Primary Examiner—Michael Lusignan
Attorney, Agent, or Firm—Anderson Kill Olick & Oshinsky

[57] ABSTRACT

A method for modifying the surface of finely divided particles, such as pigments and fillers, or of glass fibers is described. The method utilizes organopolysiloxane with epoxy and long-chain alkyl groups linked over carbon atoms to silicon atoms.

3 Claims, No Drawings

METHOD FOR MODIFYING THE SURFACE OF FINELY DIVIDED PARTICLES BY THE APPLICATION OF ORGANOFUNCTIONAL POLYSILOXANES

FIELD OF INVENTION

The invention relates to a method for modifying the surface of finely divided particles, such as pigments and fillers, or of glass fibers, by applying organopolysiloxanes with epoxy and long-chain alkyl groups linked over carbon atoms to silicon atoms.

BACKGROUND INFORMATION AND PRIOR ART

It is well known in the art to improve the properties of pigments and fillers by applying organosilicon compounds on their surfaces. Such a coating process is intended to facilitate the incorporation and dispersion of pigments or fillers in lacquers, dispersion paints, plastics, toners, building materials, enamels, etc. In addition, the agglomeration of pigments and fillers during storage and processing is avoided by such a coating procedure with organosilicon compounds. It is furthermore desirable to reduce the accumulation of dust during the storage of pigments and fillers.

This state of the art is summarized in EP-A-0 373 426 (A2). EP-A-0 373 426 describes inorganic paint and magnetic pigments containing at least 0.1 percent by weight and at most 5 percent by weight of one or several polyorganosiloxanes, which have a viscosity of 100 to 100,000 mPa×sec and a relative molecular weight of 500 to 500,000, do not contain any reactive or crosslinking groups, and contain at least one Si-alkyl and/or Si-aryl group with 9 to 25 carbon atoms per molecule, these groups being present in the polyorganosiloxane in an amount up to 7 to 70 percent by weight and the remaining organic groups in the polyorganosiloxane having 1 to 8 carbon atoms.

Admittedly, the organosilicon compounds named in the aforementioned EP-A-0 373 426 are suitable in many cases for coating dye pigments. However, they frequently fail in the case of fillers, such as magnesium or aluminum oxides or their oxide hydrates. Frequently, a better dispersibility of the coated particles and a better adhesion of the coating to the surface of the particles are also desired.

The British Patent GB 2,244,489 claims a filler which is provided with a coating of cross-linked silicone elastomers linked chemically to the surface of the inorganic core. It is evident from the examples cited there that, to begin with, highly cross linked silicone elastomers with a plurality of reactive SiOH groups (also referred to as "rubbery reactive silicones") are synthesized first. These are then applied on the inorganic filler and must be cured on this filler for 4 hours at 250° C. The silicone elastomer is the product of a cross-linking reaction between a "multifunctionally terminated" polysiloxane and a silane cross-linking agent. These coating materials are cross linked elastomers intended to improve mechanical properties, such as the extensibility and tenacity, of filled polymers.

The present invention is concerned with the technical problem of finding organosilicon compounds, which are suitable as universally as possible for coating finely divided particles of various types, particularly also of fillers. Moreover, the coated particles should have good application properties, such as an improved dispersibility and improved compatibility in organic media, such as lacquers, plastics, mineral oils, synthetic oils, vegetable oils or plasticizers. The coating shall adhere well to the surfaces of the particles so that permanence of the properties is ensured.

EP-A-0 373 426 teaches that the organopolysiloxane should be free of reactive groups. Surprisingly, it was found that the organopolysiloxanes show improved properties as coating materials on pigments and fillers especially when, in departure from the teachings of EP-A-0 373 426, groups which have a certain, graded reactivity, are linked in the siloxane molecule to silicon atoms.

OBJECT OF THE INVENTION

An object of the invention is a method for modifying the surface of finely divided particles, such as pigments and fillers or of glass fibers, by applying organopolysiloxanes with epoxy groups and long-chain alkyl groups linked over carbon atoms to silicon atoms and having the general formula

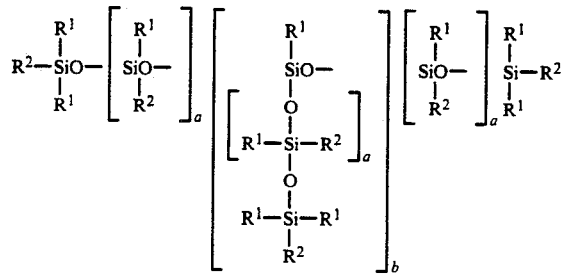

wherein $R^1$ is an alkyl group with 1 to 4 carbon atoms or a phenyl group, at least 90% of the R groups, however, being $CH_3$ groups, $R^2$ is identical with $R^1$ to the extent of 50 to 99% and is $R^3$ and $R^4$ to the extent of 1 to 50%, $R^3$ being a group having the formula

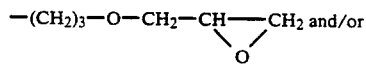

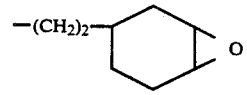

$R^4$ being a linear or branched alkyl group with 6 to 30 carbon atoms, the ratio of the $R^3$ group to the $R^4$ group falling within the range of 1:25 to 10:1, with the proviso that at least one $R^3$ group and at least one $R^4$ group must be present in the average molecule, a is a number from 1 to 500 and b is a number from 0 to 10.

for modifying the surface of finely divided particles, such as pigments and fillers, or of glass fibers.

SUMMARY OF THE INVENTION $R^1$ is an alkyl group with 1 to 4 carbon atoms or a phenyl group. At least 90% of the $R^1$ groups should be methyl groups. It is particularly preferred if all the $R^1$ groups are methyl groups. In many cases however, the compatibility with lacquers can be improved by the introduction of phenyl groups.

From 50 to 99% of the $R^2$ groups can be $R^1$ groups. The remaining $R^2$ groups characterize the organofunctional groups, which are formed in two different ways:

The one organofunctional group, referred to as $R^3$ group, is an epoxy group of the formula

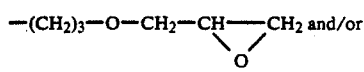

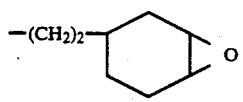

This epoxy group gives the organopolysiloxane, which is to be used pursuant to the invention, the desired substantivity and the desired graded reactivity.

The other organofunctional $R^4$ group is a linear or branched alkyl group with 6 to 30 carbon atoms. This $R^4$ group preferably has 8 to 20 carbon atoms.

In organopolysiloxane, which is to be used pursuant to the invention, 1 to 50% of the $R^2$ groups are $R^3$ and $R^4$ groups. The ratio of the $R^3$ groups to the $R^4$ groups should fall within the range of 1:25 to 10:1. However, the condition must be fulfilled that there is at least one $R^3$ group and at least one $R^4$ group in the average organopolysiloxane molecule.

The $R^3$ and $R^4$ groups can be linked terminally and/or laterally. Organopolysiloxanes with laterally linked $R^3$ and $R^4$ groups are preferred. The structure of the organopolysiloxane is determined by the value of the subscripts a and b, a indicating the content of difunctional siloxy units l and b the degree of branching. The former, a, has a value of 1 to 500 and preferably of 2 to 100, while the latter, b, has a value of 0 to 100 and preferably of 0 to 5.

The compounds can be synthesized by a known procedure by the addition reaction between $\alpha$-olefins and allyl glycidyl ethers or vinylcyclohexene oxide hand and organopolysiloxanes, in which an appropriate portion of the $R^2$ groups is replaced by the H group, in the presence of suitable catalysts, such as platinum compounds, for example, $H_2PtCl_6$, or in the presence of platinum applied on carrier material.

The modifying agents pursuant to the invention, are generally applied directly on the particles that are to be modified. This can be accomplished by spraying the modifying agents, optionally in the form of concentrated solutions. The solvents would then have to be drawn off. The modification can be brought about by mechanically applying the modifying agents, for example, by stirring, kneading or rolling. It is also possible to disperse the particles to be modified in the organic medium, for example, a binder, vehicle or plasticizer, and to add the modifying agent, pursuant to the invention, in the desired amount to this dispersion.

The modifying agent generally is used in an amount of 0.1 to 5 percent by weight, based on the particles that are to be modified. The addition of 0.3 to 2 percent by weight is preferred.

As fillers, which are to be modified pursuant to the invention, talc, calcium carbonate, dolomite, mica, wollastonite, kaolin, aluminum hydroxide, magnesium hydroxide and aluminum oxide can be used.

Pigments can be white pigments, such as $TiO_2$ pigments or colored pigments, such as $Fe_2O_3$ pigments. As further pigments, tin oxides, chromium oxides, molybdate pigments or also furnace black can be used. A comprehensive list of the pigments or fillers is given in the handbook "Kunststoff-Additive" (Additives for Plastics), 3rd edition, published by Carl Hanser Verlag, 1990, pages 549 ff. and pages 663 ff.

In the following examples, the application properties of the compounds, which are to be used pursuant to the invention, are explained in greater detail, it being understood that the examples are given by way of illustration and not by way of limitation.

APPLICATION EXAMPLES

For incorporation of pigments and fillers in lacquers, paints and plastics, advantageous rheological properties are expected by the processor. In particular, a low viscosity is desirable when the pigment and filler contents are high.

Pursuant to the invention, the pigments and fillers are treated for 1 hour in a mechanical shaker mill (SCANDEX type BAS 20) with 15 mm spheres and 0.2 to 1 percent by weight addition of the organopolysiloxanes. Subsequently, they are dispersed, at first for 1 minute at 2,000 r.p.m. (v=4.25 m/sec) and then for 3 minutes at 4,000 r.p.m. (v=8.5 m/sec), in di-2-ethylhexyl phthalate (DOP) or paraffin oil (30 cp) using a Mizer disk with a diameter of 4 cm.

The viscosities of the resulting dispersions are determined according to the method of the DIN standard 53 019 with a CONTRAVES-RHEOMAT 115 at a measurement temperature of T=25° C. with the MS-DIN 125 measuring system at an r.p.m. of 5.15 and a limiting frequency of I Hz.

As coating material, the following modified organopolysiloxane is employed:

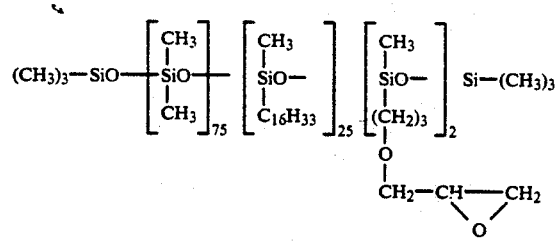

For the comparison experiments, the organopolysiloxane, which corresponds to the state of the art and has the following formula, is used as coating agent:

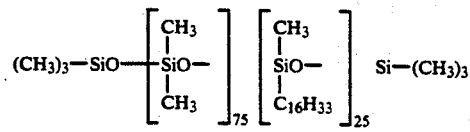

The following fillers are used as base materials for the coating:

magnesium oxide hydrate—$Mg(OH)_2$
aluminum oxide hydrate—$Al(OH)_3$

The dispersions contain 51 percent by weight of $MG(OH)_2$ or 54 percent by weight of $Al(OH)_3$ in the respective medium. They have the following viscosities in cp.

| | Viscosity in Paraffin Oil | |
|---|---|---|
| 1 percent by weight Addition of the invention: | $Mg(OH)_2$ = 45,000 | $Al(OH)_3$ = 2,800 |
| comparison: | $Mg(OH)_2$ = >60,000 | $Al(OH)_3$ = 12,000 |
| 0.5 percent by weight Addition of the invention: | $Mg(OH)_2$ = 50,000 | $Al(OH)_3$ = 6,800 |
| comparison: | $Mg(OH)_2$ = >60,000 | $Al(OH)_3$ = 7,700 |
| | Viscosity in DOP | |
| 1 percent by weight Addition of the invention: | $Mg(OH)_2$ = 12,000 | $Al(OH)_3$ = 2,500 |
| comparison: | $Mg(OH)_2$ = 33,000 | $Al(OH)_3$ = 2,500 |
| 0.5 percent by weight Addition of the invention: | $Mg(OH)_2$ = 16,000 | $Al(OH)_3$ = 2,900 |
| comparison: | $Mg(OH)_2$ = 34,000 | $Al(OH)_3$ = 2,900 |

Uncoated base material, at a concentration of 40 percent by weight of filler in DOP or paraffin oil, has a pasty consistency, whose viscosity cannot be measured.

We claim:

1. A method for modifying the surface of a particle which comprises applying to the particle organopolysiloxanes with epoxy and long-chain alkyl groups linked over carbon atoms to silicon atoms of the general formula

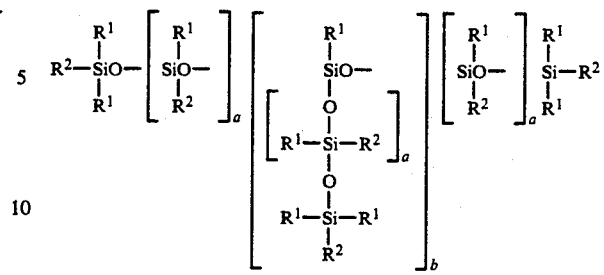

wherein $R^1$ is an alkyl group with 1 to 4 carbon atoms or a phenyl group, at least 90% of the R groups, however, being $CH_3$ groups;

$R^2$ is identical with $R^1$ to the extent of 50 to 99% and is $R^3$ and $R^4$ to the extent of 1 to 50%;

$R^3$ being a group having the formula

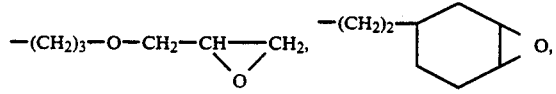

or mixtures thereof;

$R^4$ being a branched alkyl group with 6 to 30 carbon atoms; the ratio of the $R^3$ group to the $R^4$ group falling within the range of 1:25 to 10:1, with the proviso that at least one $R^3$ group and at least one $R^4$ group must be present in the average molecule;

a is a number from 1 to 500 and b is a number from 0 to 10.

2. The method according to claim 1, wherein the particle is one of the group consisting of pigments, fillers and glass fibers.

3. A particle modified by the method of claim 1.

* * * * *